UNITED STATES PATENT OFFICE 2,640,828

N,N-DISUBSTITUTED β-HALOETHYLAMINES

Kenneth N. Campbell, South Bend, Ind., and Glenn E. Ullyot, Philadelphia, Pa., assignors to Smith, Kline & French Laboratories, Philadelphia, Pa., a corporation of Pennsylvania No Drawing. Application April 13, 1949, Serial No. 87,362

6 Claims. (Cl. 260—286)

This invention relates to certain new and useful N,N-disubstituted β-haloethylamines and their inorganic and organic acid addition salts.

The new compounds in accordance with this invention have valuable physiological properties, more particularly sympatholytic or adrenolytic action.

The novel compounds in accordance with this invention are made apparent by the following formula:

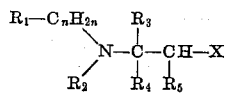

in which $R_1$ designates a heterocyclic radical from the group consisting of quinolyl, furyl, imidazolyl, benzimidazolyl and thiazolyl, the members of said group being unsubstituted or substituted with a member of the group consisting of methoxy, amino, substituted amino, acylamino, halogen or alkyl groups.

$R_2$ is a member of the group consisting of alkyl, aralkyl and substituted aralkyl groups.

$R_3$, $R_4$ and $R_5$ are members of the group consisting of hydrogen and alkyl groups selected so that the sum of the carbon atoms in $R_3$, $R_4$ and $R_5$ does not exceed five carbon atoms.

$n$ is an integer not greater than three.

X is a member of the group consisting of chlorine and bromine.

More specifically, the compounds included within the above definition will be made apparent by the following formula:

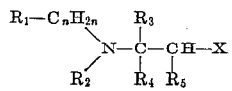

in which $R_1$ designates a heterocyclic radical from the group consisting of 2-quinolyl; 2-quinolyl substituted with methyl, halogen, methoxy, amino, dimethylamino; 4-quinolyl; 4-quinolyl substituted with methyl, halogen, methoxy, amino, dimethylamino, 2-furyl, 2-furyl substituted with methyl, halogen; 4-imidazolyl; 4-imidazolyl substituted with methyl; 2-benzimidazolyl; 5- thiazolyl; 5-thiazolyl substituted with methyl; 4-thiazolyl; 4-thiazolyl substituted with methyl; amino.

$R_2$ is a member of the group consisting of alkyl containing not more than 8 carbon atoms, i. e., methyl, ethyl, propyl, butyl, amyl, hexyl, heptyl, octyl; aralkyl the alkyl portion of which does not contain more than three carbon atoms; substituted aralkyl groups in which the alkylene portion does not contain more than three carbon atoms and the substituent of the aryl portion is chosen from the group consisting of methyl, methoxy, amino, dimethylamino, acetylamino and halogen groups.

$R_3$, $R_4$ and $R_5$ are members of the group consisting of hydrogen and alkyl groups selected so that the sum of the carbon atoms in $R_3$, $R_4$ and $R_5$ does not exceed five carbon atoms.

$n$ is an integer not greater than three.

X is a member of the group consisting of chlorine and bromine.

The compounds contemplated by this invention will, as has been indicated, comprise the free base, as made apparent by the above formulae, and inorganic and organic salts thereof, as, for example, hydrochlorides, hydrobromides, sulfates, phosphates, oxalates, maleates, and the like. More specifically, the inorganic and organic salts will be such as are prepared with inorganic and organic acids have an ionization constant not less than $1 \times 10^{-2}$ at 18° C.

In the several formulae set forth hereinafter in connection with description of method for the preparation of compounds in accordance with this invention and by way of example of specific compounds in accordance with this invention, the substituents for $R_1$, $R_2$, $R_3$, $R_4$, $R_5$, $n$ and X appearing in the several formulae hereinafter will be as given in connection with the foregoing general formulae.

The novel N,N-disubstituted β-haloethylamines according to this invention may be prepared by way of example by two general methods.

Method A

Procedure according to this method involves as a first step forming a secondary amine having the formula

This secondary amine is formed by hydrogenation of a mixture of a heterocyclic aldehyde or ketone, such as furfural, lepidylaldehyde, furylacetone, or the like, and a primary amine such as benzylamine, ethylamine, isopropylamine, or the like, at hydrogen pressures of 3 to 50 atmospheres and temperature of 20°–100° C. in the presence of a hydrogenation catalyst, as, for example, palladium, platinum, activated nickel, or the like. A solvent, as, for example, ethyl alcohol, methyl alcohol, glacial acetic acid, or the like, may be employed.

Alternatively, the secondary amines having the above formula may be formed by reaction of a heterocyclic halide having the formula $$R_1\text{---}C_nH_{2n}\text{---}X$$

with a primary amine having the formula $R_2NH_2$, with or without use of a solvent, as alcohol, benzene, or the like, at a temperature of 25–125° C., the particular temperature depending upon the reactivity of the halide used.

The secondary amines formed by either of the procedures above are reacted with an alkylene oxide, such as ethylene oxide, propylene oxide, or the like, preferably in the presence of a small amount of water, and in the presence or absence of an inert solvent such as benzene, at temperatures preferably in the range of 50–125° and pressures up to 150 pounds per square inch, with production of an amino alcohol. This reaction and the amino alcohol product is made apparent by the following equation:

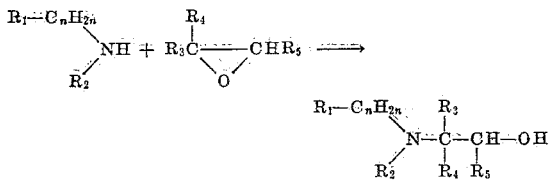

It will be apparent that in carrying out the above reaction for the production of the amino alcohol reagents other than an alkylene oxide may be used. Thus, instead of an alkylene oxide other reagents capable of introducing a β-hydroxyethyl group, such as ethylene chlorohydrin, ethylene bromohydrin and propylene bromohydrin, or the like, may be employed. The reaction for forming amino alcohols may be carried out with or without a solvent. Where a solvent is used, such may, for example, be alcohol or benzene.

For the production of the compounds in accordance with this invention, an amino alcohol, for example, formed as above, or its hydrohalide salt, formed in any well known manner, is treated with a reagent, for example, thionyl chloride, thionyl bromide, phosphorus trichloride, or the like, which will act to replace the hydroxyl group with chlorine or bromine. This reaction may be carried out with use of an excess of the halogenating agent which will also serve as a solvent and, if desired, an inert substance such as chloroform, benzene, or the like, may be used as a diluent.

By the method as above described the compounds wil be produced in the form of hydrohalide salts. Free bases thereof may be readily prepared by usual and well known procedure using an inorganic base, such as sodium carbonate, sodium hydroxide and the like.

Organic and inorganic salts of the free bases may be readily prepared by a usual and well known procedure using an inorganic or organic acid, as exemplified above, corresponding to the salt desired.

Method B

As alternative to the procedure described under Method A for the preparation of the intermediate amino alcohol, this intermediate may be prepared from monosubstituted ethanolamines by reaction of monosubstituted ethanolamines with heterocyclic halogen compounds as shown by the following equation:

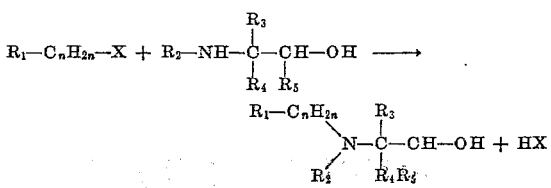

In proceeding as above, an excess of the monosubstituted ethanolamine may be used to combine with hydrogen halide formed in the reaction or an acid binding agent, such, for example, as potassium carbonate, magnesium oxide, or the like, may be employed. A solvent, as, for example, benzene, alcohol, or the like, may be used, or the reaction may be carried out without a solvent. The temperature employed will be within the range 25–150° C. and the particular temperature in any given case will depend upon the reactivity of the heterocyclic halogen compound used. The final product, the compound in accordance with this invention, in the instant case in the form of a hydrohalide salt, will be formed by reacting the tertiary amino alcohol formed as above with a reagent capable of replacing the hydroxyl group with chlorine or bromine, as described above in connection with Method A.

The following specific examples will be illustrative of compounds of the various types contemplated by this invention and detailed procedure for their production and will make apparent all the compounds within the scope of this invention and procedure for their production:

EXAMPLE 1

*(Method A)*

N - furfuryl - N - benzyl - β - chlorethylamine hydrochloride:

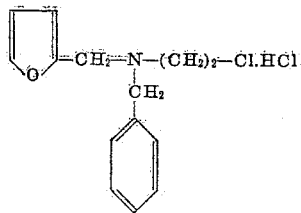

Furfurylbenzylamine is prepared as follows: A solution of 18.5 g. of furfurylidene benzylamine (made by reacting benzylamine with furfural) in 75 ml. of alcohol is shaken with hydrogen at 3–4 atmospheres in the presence of 3 g. of freshly prepared Raney nickel catalyst until the theoretical amount of hydrogen is taken up. The catalyst is removed by filtration and the filtrate distilled. The secondary amine boils at 115–124° C./4 mm., $n_D^{20}$ 1:5543–1.5580.

A mixture of 20 g. of the above amine, 4.4 g. of ethylene oxide and 2 g. of water is heated for 16 hours at 90–100° C. The reaction mixture is taken up in ether, dried and distilled. There is obtained 10 g. of tertiary amino alcohol, B. P. 122–126° C./0.08 mm. The hydrochloride salt melts at 152–154° C. with decomposition.

Seven grams of N-furfuryl-N-benxylaminoethanol is cooled and treated with 20 ml. of purified thionyl chloride and after the initial vigorous reaction has ceased, the mixture is warmed on a water bath at 45° C. for fifteen minutes. The excess thionyl chloride is removed under reduced pressure and the oily residue is triturated with ether to make it solidify. The N-furfuryl-N- benzyl-β-chlorethylamine hydrochloride is recrystallized from alcohol, M. P. 118–122° C. with decomposition.

EXAMPLE 2

*(Method A)*

N - furfuryl - N - ethyl - β - chloroethylamine hydrochloride:

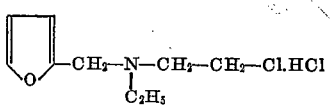

This compound is prepared in the same manner as the previous example, except that, in the first step, an equivalent quantity of ethylamine is used instead of benzylamine.

EXAMPLE 3

*(Method A)*

N - furfuryl - N - benzyl - 1 - amino - 2 - chloropropane hydrochloride:

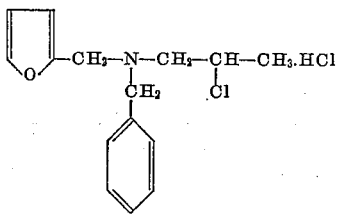

The procedure of Example 2 is followed except that, in the second step, propylene oxide is used in place of ethylene oxide.

EXAMPLE 4

*(Method B)*

N-(4-imidazolylmethyl)-N-benzyl-β-chlorethylamine dihydrochloride:

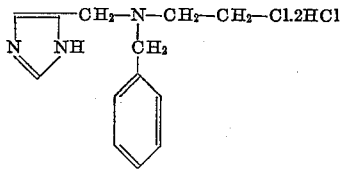

The intermediate N-(4-imidazolylmethyl)-N-benzylaminoethanol is prepared by adding 8.0 g. of 4-chloromethylimidazole hydrochloride in small portions to a solution of 25 g. of benzylaminoethanol in 50 ml. of absolute alcohol with cooling in an ice bath. The mixture is allowed to stand at room temperature for thirty minutes and then warmed at 60° C. for three hours. Ether is added, the precipitated solid removed by filtration and the solution evaporated. The residual oil is treated, in n-propanol solution, with dry hydrogen chloride to form the dihydrochloride salt which melts at 182–184° C. with decomposition.

Fifteen milliliters of thionyl chloride is added to a solution of 3 g. of the above amino alcohol in 30 ml. of chloroform and the solution is refluxed for twenty minutes. The colorless solid which separates is collected and recrystallized from mixtures of methanol and ether. The β-chlorethylamine dihydrochloride melts at 194–194.5° C. with decomposition.

EXAMPLE 5

*(Method B)*

N-(4 - imidazolylmethyl)-N-(p - methoxybenzyl)-β-chlorethylamine dihydrochloride:

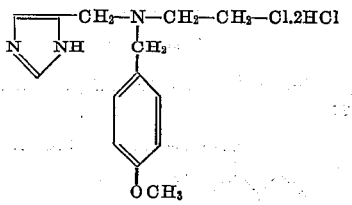

This compound is prepared in the same manner as the previous example except that an equivalent quantity of p-methoxybenzylaminoethanol is used instead of benzylaminoethanol. The p-methoxybenzylaminoethanol is prepared in the following manner: One half mole of p-methoxybenzaldehyde and one half mole of ethanol are dissolved in 100 ml. of alcohol and the solution is shaken under a pressure of 3–4 atmospheres of hydrogen in the presence of 0.5 g. of platinum oxide catalyst. When hydrogen absorption is substantially complete, the solution is filtered and the alcohol is removed by distillation. Distillation of the remainder under reduced pressure yields p - methoxybenzylaminoethanol, B. P. 178–185° at 6 mm.

EXAMPLE 6

*(Method B)*

N-lepidyl-N-benzyl - β - chlorethylamine dihydrochloride:

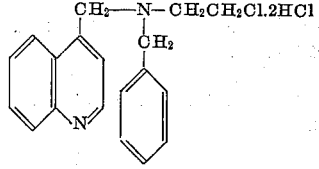

Fifteen grams of lepidine is added to a suspension of 15 g. of N-bromosuccinimide in 50 ml. of carbon tetrachloride at 60° and the mixture is refluxed for thirty minutes and filtered hot. On cooling the filtrate, lepidyl bromide, M. P. 88–91°, is deposited.

A mixture of 8 g. of lepidyl bromide, 10.8 g. of benzylaminoethanol and 75 ml. of benzene is refluxed for five hours. After filtering, the solution is evaporated under reduced pressure to give 6 g. of crude N-lepidyl-N-benzylaminoethanol as a light tan oil.

Six grams of the above amino alcohol in 50 ml. of chloroform is cooled while 15 ml. of thionyl chloride is added in small portions. The solution is refluxed for a few minutes and the solvent evaporated at room temperature. The residue is dissolved in hot n-propanol solution containing hydrogen chloride. The solution is allowed to cool and insoluble material filtered off. The product, N - lepidyl-N-benzyl-β-chlorethylamine dihydrochloride, which melts at 155° C., is obtained by adding ether to the filtrate.

EXAMPLE 7

*(Method B)*

N-(6-chlorolepidyl)-N-benzyl - β - chlorethylamine dihydrochloride:

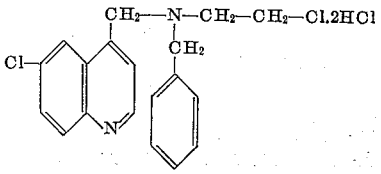

The procedure of the preceding example is followed. An equivalent amount of 6-chlorolepidine is used as starting material instead of lepidine.

EXAMPLE 8

(Method B)

N-lepidyl-N-ethyl-β-chlorethylamine dihydrochloride:

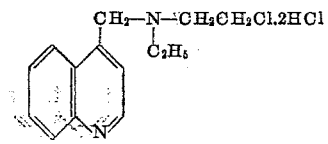

This compound is prepared by the method described under Example 8. In the second step, ethylaminoethanol is substituted for benzylaminoethanol.

EXAMPLE 9

(Method B)

N-quinaldyl-N-ethyl-β-chlorethylamine dihydrochloride:

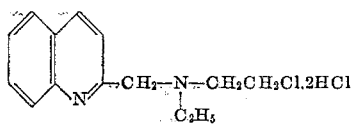

The procedure of Example 8 is followed. Bromoquinaldine (see Hammich: J. Chem. Soc. 1926, 1302) is reacted with ethylaminoethanol in benzene solution. The resulting amino alcohol is then treated with thionyl chloride as in the above examples.

EXAMPLE 10

(Method B)

N-(4-methyl-5-thiazolylethyl)-N-benzyl-β-chlorethylamine dioxalate:

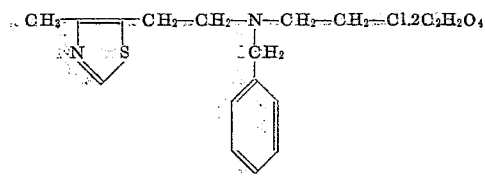

A solution of 9.6 g. of 4-methyl-5-(β-bromoethyl)-thiazole (see Buchmann: J. Am. Chem. Soc. 58, 1805 (1936)) in 10 ml. of benzene is treated with 15 g. of benzylaminoethanol and the mixture heated at 100° C. for 17 hours. On cooling, benzylaminoethanol hydrobromide is deposited and is removed by filtration. Distillation of the filtrate gives 8 g. of intermediate amino alcohol, B. P. 174–175° C. 10.05 mm.

Twenty milliliters of thionyl chloride is added to a cooled solution of 8 g. of the above amino alcohol in 50 ml. of chloroform and the solution is refluxed for fifteen minutes. Evaporation of the solvent leaves an oily residue which is treated with sodium bicarbonate solution. The water-insoluble product is extracted with ether. The oxalate salt is formed by adding a solution of 6 g. of anhydrous oxalic acid in 30 ml. of alcohol to the dried ether solution of the free base. The dioxalate salt so formed is hydrated with one molecule of water and melts at 103–105° C.

EXAMPLE 11

(Method B)

N-(2-benzimidazolylmethyl)-N-benzyl-β-chlorethylamine dihydrochloride:

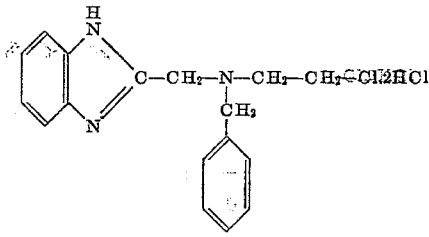

Twenty-five grams of 2-chloromethylbenzimidazole is added, with cooling, over a half-hour period to a solution of 45 g. of benzylaminoethanol in 50 ml. of alcohol. The reaction mixture is heated at 50–60° C. for three hours, ether is added and the precipitated benzylaminoethanol is removed by filtration. The solvent is evaporated and the tertiary amino alcohol recrystallized from aqueous acetone, M. P. 139.5–141° C. The dihydrochloride melts at 178–179.5° C.

Thirty-two grams of the above amino alcohol dihydrochloride is added to 71 g. of thionyl chloride and the mixture refluxed for two hours. Removal of the excess thionyl chloride in vacuo leaves the β-chlorethylamine dihydrochloride which, after recrystallization from alcohol and ether, melts at 164–166° C.

EXAMPLE 12

(Method A)

N-(β-furylisopropyl)-N-benzyl-β-bromoethylamine hydrobromide:

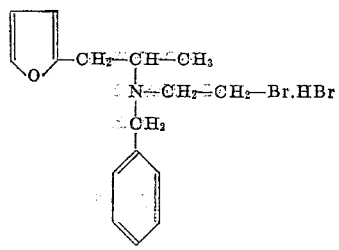

This compound is prepared in the manner described in Example 2. In the first step an equivalent amount of furylacetone is used instead of furfural. In the final step, thionyl bromide is employed in place of thionyl chloride.

The compounds of this invention may be isolated as free bases by addition of an aqueous solution of a base to a salt as illustrated in Example 12. Addition of an acid, in any suitable solvent, to the free base forms an acid addition salt. This procedure is illustrated again in Example 12.

EXAMPLE 13

(Method B)

N-(2-amino-4-thiazolylmethyl)-N-ethyl-β-chlorethylamine hydrochloride:

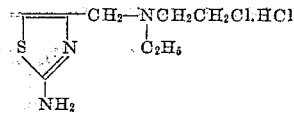

This compound will be prepared in the same manner as Example 10. The starting materials will be 2-amino-4-(chloromethyl)thiozole and ethylaminoethanol instead of 4-methyl-5-(β-bromoethyl)thiozole and benzylaminoethanol.

EXAMPLE 14

(*Method B*)

N-(6 - methoxylepidyl) - N - (p - methoxybenzyl)-β-chlorethylamine dihydrochloride:

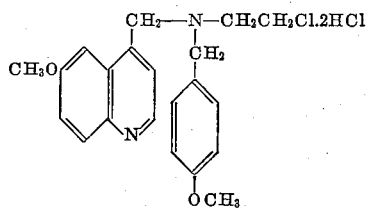

The procedure of Example 6 will be followed, using p-methoxybenzylaminoethanol, prepared as described under Example 5 and 6-methoxylepidine.

EXAMPLE 15

(*Method B*)

N-(4-imidazolylethyl)-N-benzyl-β-chlorethylamine dihydrochloride:

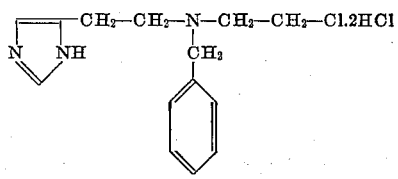

This compound will be prepared in the same manner as Example 4 except that 4-(β-chloroethyl) imiazole hydrochloride will be used in place of 4-chloromethylimidazole hydrochloride. The 4-(β-chloroethyl) imiazole hydrochloride will be added to an alcoholic solution of benzylamine and then refluxed for six to eight hours. The product will be worked up and reacted with thionyl chloride as described under Example 4.

EXAMPLE 16

(*Method B*)

N - (2 - benzimidazolylmethyl) - N-(p-methylbenzyl)-β-chlorethylamine dihydrochloride:

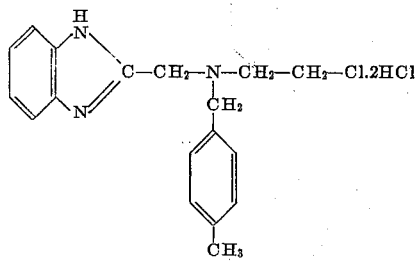

p-Methylbenzylaminoethanol will be prepared from p-methylbenzaldehyde and ethanolamine by the method described in Example 5 for the p-methoxy compound. p-Methylbenzylaminoethanol boils at 144–148° at 4 mm. and forms a hydrochloride melting at 113–115°

The p-methylbenzylaminoethanol will be reacted with 2-chloromethylbenzimidozole in the same manner as described for Example 11. The product will be refluxed with thionyl chloride to form the desired β-chlorethylamine.

EXAMPLE 17

(*Method A*)

N - furfuryl - N - (p-dimethylaminobenzyl)-β-chlorethylamine dihydrochloride:

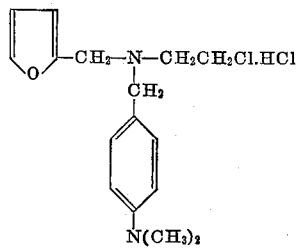

This compound will be prepared in the same manner as Example 1. In the first step, p-dimethylaminobenzylamine will be employed instead of benzylamine.

EXAMPLE 18

(*Method B*)

N - (4 - imidazolylmethyl) -N-(p-acetylaminobenzyl)-β-chlorethylamine dihydrochloride:

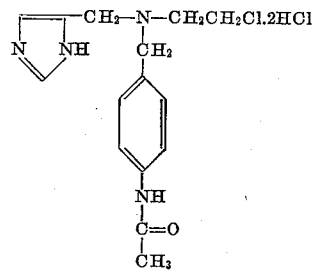

p-Acetylaminobenzylaminoethanol will be prepared by hydrogenation of a solution of p-acetylaminobenzaldehyde and ethanolamine in the same manner as described for the preparation of p-methoxybenzylaminoethanol in Example 14.

The procedure of Example 4 will be followed in the reaction of 4-chloromethylamidazole hydrochloride with p-acetylaminobenzylaminoethanol to form N - (4-imidazolylmethyl)-N-(p-acetylaminobenzyl) aminoethanol. The dihydrochloride of this amino alcohol will be treated with thionyl chloride in chloroform solution to form the end product.

EXAMPLE 19

(*Method B*)

N - (4-imidazolylmethyl)-N-(p-aminobenzyl)-β-chlorethylamine trihydrochloride

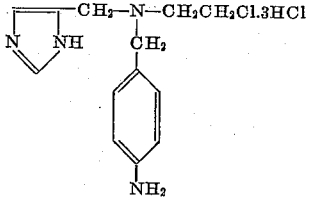

N - (4 - imidazolylmethyl)-N-(p-acetylaminobenzyl) aminoethanol, prepared as described in the previous example, will be heated in aqueous alcohol solution of sodium hydroxide to remove the acetyl group. The resulting N-(4-imidazolylmethyl)-N-(p-amino benzyl) aminoethanol will be converted to the trihydrochloride salt with anhydrous hydrogen chloride and this salt will be treated with thionyl chloride in chloroform solution as described in Example 4.

EXAMPLE 20

*(Method B)*

N-(4-imidazolylmethyl)-N-(n-amyl)-β-chlorethylamine dihydrochloride:

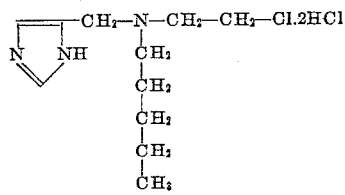

The procedure of Example 4 will be followed. In the first step n-amylaminoethanol will be used in place of benzylaminoethanol.

EXAMPLE 21

*(Method B)*

N-(2-benzimidazolylmethyl)-N-(4-heptyl)-2-amino-1-chloropropane dihydrochloride:

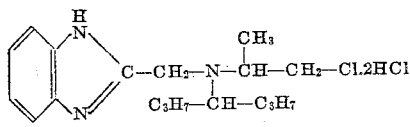

In the procedure of Example 11, 2-chloromethylbenzimidazole will be reacted with 2-(4-heptylamino) propanol instead of benzylaminoethanol. The product, as the dihydrochloride salt, will be reacted with thionyl chloride to form the above compound.

EXAMPLE 22

*(Method B)*

N-(4-methyl-5-thiazolylethyl)-N-isopropyl-2-amino-3-chloropentane hydrochloride:

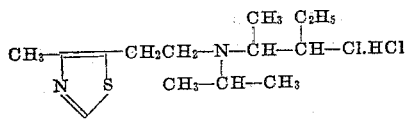

The procedure of Example 10 will be followed. In the first step an equivalent amount of N-isopropyl-2-amino-3-pentanol will be employed instead of benzylaminoethanol. The N-isopropyl-2-amino-3-pentanol will be formed by adding acetone to an alcoholic solution of 2-amino-3-pentanol and agitating the resulting solution under hydrogen pressure in the presence of platinum catalyst.

It will be self-evident to those skilled in the art that in the foregoing examples illustrative of the production of chloride hydrochlorides by the procedures described bromide hydrobromides will be produced with the use, for example, of thionyl bromide in place of thionyl chloride in the final step. Thus, the foregoing specific examples of chloride hydrochlorides serve as specific examples of bromide hydrobromides by simply replacing Cl.HCl in the several formulae with Br.HBr.

It will be noted, as is perfectly apparent, that the chloride hydrochlorides and bromide hydrobromides of the foregoing examples may be isolated as free bases by the treatment of the salts with a solution of a base as, for example, sodium bicarbonate, sodium hydroxide, or the like, in well known manner. Hence, the foregoing specific examples of chloride hydrochlorides and bromide hydrobromides will serve to specifically exemplify the corresponding free bases by the mere elimination from the several formulae of HCl or HBr.

Again, the inorganic and organic salts of the free bases exemplified above will be formed in well known manner by treatment of the free bases with an inorganic or organic acid corresponding to the salts desired and the several foregoing specific examples will be specifically illustrative of inorganic and organic salts by the simple expedient of substituting in the formulae given the desired inorganic or organic acid radical for HCl or HBr.

What we claim and desire to protect by Letters Patent is:

1. A compound of the class consisting of a free base and its acid addition salts, said free base having the formula:

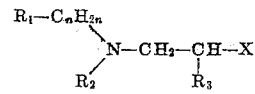

in which $R_1$ is a heterocyclic radical selected from the group consisting of unsubstituted quinolyl, furyl, imidazolyl, benzimidazolyl, thiazolyl, and methyl substituted quinolyl, furyl, imidazolyl, benzimidazolyl, and thiazolyl; $R_2$ is selected from the group consisting of benzyl, methyl benzyl, methoxy benzyl, and halo benzyl radicals; $R_3$ is selected from the group consisting of hydrogen and methyl radicals; $n$ is an integer not greater than three and not less than one; and X is selected from the group consisting of chlorine and bromine.

2. The compound N-furfuryl-N-benzyl-β-chlorethylamine hydrochloride having the structure:

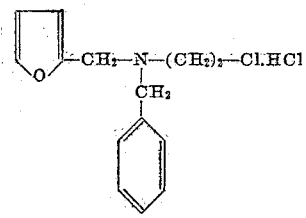

3. The compound N-(4-imidazolylmethyl)-N-benzyl-β-chlorethylamine dihydrochloride having the structure:

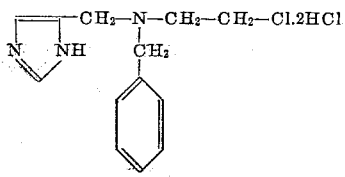

4. The compound N-lepidyl-N-benzyl-β-chlorethylamine dihydrochloride having the structure:

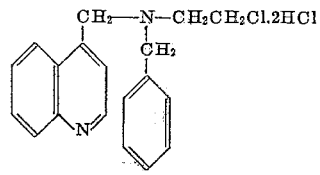

5. The compound N-(4-methyl-5-thiazolylethyl)-N-benzyl-β-chlorethylamine dioxalate having the structure:

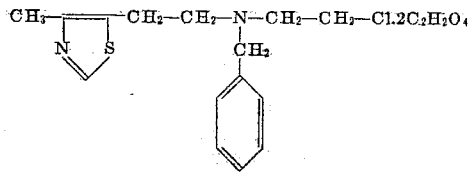

6. The compound N-(2-benzimidazolylmethyl)-N-benzyl-β-chlorethylamine dihydrochloride having the structure:

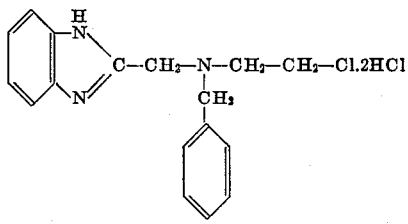

KENNETH N. CAMPBELL.
GLENN E. ULLYOT.

References Cited in the file of this patent

UNITED STATES PATENTS

| Number | Name | Date |
|---|---|---|
| 1,949,247 | Eisleb | Feb. 27, 1934 |

OTHER REFERENCES

Goldin et al.: J. Pharm. Exp. Therap., vol. 94, p. 256 (1948).

Fruton et al.: J. Org. Chem., vol. 11, pp. 571–585 (1946.)

Huttrer: Enzymologia, vol. 12, pp. 304, 305, 319, 320, and 321 (April 1948).

Fieser and Fieser: "Organic Chemistry," (D. C. Heath and Co., Boston, 1944), p. 32.

Nickerson et al.: Federation Proceedings, vol. 5, p. 195 (1946).

Beyer: Physiological Rev., Apr. 1946, p. 191.

Williams: "Detoxification Mechanisms" (John Wiley, New York, 1947), pp. 194–197.